United States Patent [19]

Kittelmann et al.

[11] 4,454,056

[45] Jun. 12, 1984

[54] PROCESS FOR THE PRODUCTION OF ZEOLITES MODIFIED ON THE SURFACE WITH ORGANOSILANES

[75] Inventors: Udo Kittelmann, Roedermark; Manfred Diehl, Frankfurt; Roland Bergmann, Hanau; Gunter Stadtmuller, Alzenau, all of Fed. Rep. of Germany

[73] Assignee: Degussa Aktiengesellschaft, Frankfurt am Main, Fed. Rep. of Germany

[21] Appl. No.: 473,634

[22] Filed: Mar. 9, 1983

[30] Foreign Application Priority Data

Mar. 10, 1982 [DE] Fed. Rep. of Germany ....... 3208598

[51] Int. Cl.$^3$ .......................... C02F 1/42; C11D 3/12; C11D 11/04; C11D 17/06
[52] U.S. Cl. .................... 252/174.15; 252/140; 252/174.25; 252/179; 427/219; 428/405; 556/482; 502/62
[58] Field of Search ................. 252/131, 140, 174.25, 252/179, 430, 455 Z, 174.15; 556/482; 428/405; 427/219

[56] References Cited

U.S. PATENT DOCUMENTS

| | | | |
|---|---|---|---|
| 3,846,463 | 11/1974 | Nagai | 556/482 |
| 4,034,139 | 7/1977 | Mazarguil | 428/405 |
| 4,073,867 | 2/1978 | Roebke | 423/329 |
| 4,138,363 | 2/1979 | Hertzenberg | 252/430 |
| 4,183,814 | 1/1980 | Ramachandran | 556/482 |
| 4,216,125 | 8/1980 | Campbell | 252/527 |
| 4,243,545 | 1/1981 | Campbell | 252/140 |
| 4,303,626 | 12/1981 | Strack | 423/329 |
| 4,303,627 | 12/1981 | Strack | 423/329 |
| 4,303,628 | 12/1981 | Strack | 423/329 |
| 4,303,629 | 12/1981 | Strack | 423/329 |
| 4,305,916 | 12/1981 | Strack | 423/329 |

FOREIGN PATENT DOCUMENTS

| | | |
|---|---|---|
| 2447021 | 5/1976 | Fed. Rep. of Germany . |
| 2651419 | 5/1978 | Fed. Rep. of Germany . |
| 2651420 | 5/1978 | Fed. Rep. of Germany . |
| 2651436 | 5/1978 | Fed. Rep. of Germany . |
| 2517218 | 10/1978 | Fed. Rep. of Germany . |

*Primary Examiner*—Dennis L. Albrecht
*Attorney, Agent, or Firm*—Cushman, Darby & Cushman

[57] ABSTRACT

The invention is directed to a process for the production of zeolites of the type Na A4 having the surface modified with organosilanes. The organosilane must have at least one alkoxy group bonded to the silicon atom. The modified zeolites of the invention are used in washing and cleansing agents.

22 Claims, No Drawings

PROCESS FOR THE PRODUCTION OF ZEOLITES MODIFIED ON THE SURFACE WITH ORGANOSILANES

BACKGROUND OF THE INVENTION

The invention is directed to a process for the production of zeolites having the surface modified with organosilanes.

It is known to replace phosphates in washing agents (detergents) with crystalline zeolites of the type NaA4 which have a specific particle size distribution.

However, it has been found that zeolites with a small particle size have a tendency to agglomerate in the production of the washing agent. The agglomerate thus formed impairs the effectiveness and in the most unfavorable case deposits on the wash. One possibility of reducing the tendency of powdery materials to agglomerate is to modify the surface.

It is known to react water free zeolites with silanes at elevated temperatures. However, this is a matter of Y-zeolites which are present in the exchanged H-form. They were reacted at temperatures between 250° and 650° C. with tetramethylsilane and subsequently their activity as catalysts tested. (McAteer, J. J. Rooney "Proceedings of the 3rd Int. Conference on Molecular Sieves", J. B. Unterhaeven, Editor, Zurich, Sept. 3–7, 1973, pages 258–265).

Furthermore, it is known to treat zeolites in the Na-form with organosilanes (Hertzenberg U.S. Pat. No. 4,138,363, German OS No. 2,843,709 and Campbell U.S. Pat. No. 4,243,545) and in this manner reduce the tendency to agglomerate. Thereby the calcium binding capacity of the zeolite is only insignificantly influenced which is significant for inclusion in detergents.

However, a condition for the employment of the silane according to this process is that after the reaction of the alkoxy group with the zeolite the silane still has a further reactive group such as, e.g. acryl, epoxy, or amino groups.

Only the presence of these groups causes the above induced improvement in properties of the surface modified zeolites.

The production of this type of silane, however, is associated with great expense which makes the product correspondingly expensive.

The reactive groups of the silane still remaining after the reaction with the zeolite surface moreover results in the modified zeolites not being compatible with all surface active agents which customarily are used in detergents.

The object of the invention is to produce a zeolite having the surface modified with silanes which avoids these disadvantages.

SUMMARY OF THE INVENTION

The subject matter of the invention is a process for the production of crystalline zeolites in the Na-form having the surface modified with an organo-silane, which is characterized by reacting the zeolite with 0.02–5 weight % based on the amount of the zeolite employed of an organosilane of the formula

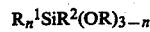

in which

R and $R^1$ are the same or different and are $C_1$–$C_5$-alkyl, methoxy, ethoxy, phenyl and $C_5$–$C_8$ cycloalkyl, $R_2$ is a monovalent hydrocarbon group free of ethylenic double bonds and having 1 to 8, e.g. three to eight carbon atoms, and n is zero, 1 or 2, whereby the organosilane in a given case is employed dissolved in an organic solvent. Especially suited organosilanes are n-propyl triethoxysilane and dimethyl diethoxysilane.

Other illustrative silanes are methyl triethoxysilane, methyl trimethoxy silane, methyl triphenoxysilane, propyl triphenoxysilane, methyl tricyclopentoxysilane, propyl tricyclohexoxy silane, methyl tricyclooctoxysilane, propyl diethoxy phenoxysilane, methyl tripropoxysilane, methyl tri-n-amyloxysilane, propyl triisopropoxysilane, ethyl triethoxysilane, diethyl diethoxysilane, isopropyl triethoxysilane, n-butyl triethoxysilane, n-amyl triethoxysilane, n-amyl trimethoxysilane, phenyl triethoxysilane, cyclopentyl triethoxysilane, cyclohexyl triethoxysilane, cyclooctyl triethoxysilane, methyl ethyl diethoxysilane, tri(n-propyl)ethoxysilane, n-propyl trimethoxysilane, di(n-propyl)diethoxysilane, trimethyl ethoxysilane, diphenyl diethoxysilane, diethyl diethoxysilane, n-octyl triethoxysilane, methyl tri(methoxyethoxy)silane, propyl tri(ethoxyethoxy)silane.

In a preferred form of the invention there is employed as starting material a zeolite produced according to one of the following patents and having the particle size distribution stated therein.

German OS No. 2447021
German OS No. 2517218 and related Roebke U.S. Pat. No. 4,073,867
German OS No. 2651419 and related Strack U.S. Pat. No. 4,303,628
German OS No. 2651420 and related Strack U.S. Pat. No. 4,303,626
German OS No. 2651436 and related Strack U.S. Pat. No. 4,305,916
German OS No. 2651437 and related Strack U.S. Pat. No. 4,303,627
German OS No. 2651445
German OS No. 2651485 and related Strack U.S. Pat. No. 4,303,629

The entire disclosure of the above-identified published German OS and related United States patents are hereby incorporated by reference and relied upon. There can be used mixtures of zeolites of Type A made according to two or more of the just mentioned German OS and U.S. patents.

Preferably there is employed a zeolite powder of Type A according to German OS No. 2651485 or related Strack U.S. Pat. No. 4,303,629.

The water content of the zeolites can be 0 to 25%, preferably 15 to 25%.

For the production of the products of the invention the organosilane can be dropped or sprayed on the zeolite present in a closed container, e.g. in the manner employed in the aforementioned Hertzenberg U.S. Pat. No. 4,138,363, the entire disclosure of which is hereby incorporated by referenced and relied upon. The amount of the organosilane is 0.02–5 weight % based on the amount of zeolite employed. Preferably, there is used 0.02–2 weight % of the organosilane.

However, the same amount of organosilane can also be dissolved in an organic solvent and be mixed with the zeolite. Preferably, the concentration of the silane in solvent is between 0.5 and 1 weight %. As solvents there are especially suited apolar, saturated aliphatic and unsaturated cyclic hydrocarbons*. Advantageously there are also usable aliphatic alcohols, e.g. methyl alcohol, ethyl alcohol, isopropyl alcohol, n-propyl alcohol. The purpose of diluting the silane by a solvent is for uniform distribution on the zeolite surface during the spraying or dropping. The solvent is then drawn off after the subsequent reaction if it has not already evaporated during the reaction temperature which takes place at an elevated temperature.

* i.e. hexane, leptane, toluene, xylene

The total concentration of the silane in the solvent corresponds to the above given 0.02–5 weight % based on the amount of the zeolite being reacted.

The reaction mixture of zeolite/silane or silane/solvent is intensively mixed at temperatures between 30° C. and 150° C., preferably 80° and 150° C., until there has occurred a complete reaction of the silane.

In a preferred illustrative form the organo-silane can be employed as an aqueous suspension which has a content between 20 and 60 weight %, preferably 43 and 51 weight % zeolite. Thereby a stabilization agent contained in this type of suspension is not disturbing. Subsequently the suspension is spray dried. Then there is likewise obtained a powder, whose flowability and agglomeration behavior are improved in comparison with the starting zeolite. This means that in this case the surface modification has occurred with the heating in the spray tower.

As organosilanes there are preferably employed di and trialkoxysilanes in which the chain length of the other carbon group attached to the silicon atom does not exceed $C_4$.

The reactive alkoxy groups react with the zeolite so that after the reaction only inert hydrocarbon groups are bound to the silicon atom. For this reason there is no need to fear reaction of these groups with the other surface active materials employed in the detergent.

The modified zeolite obtained according to the invention surprisingly shows a clear improvement of the flowability and shows a clearly reduced tendency to agglomerate compared to the starting material, although the unreacted silane no longer has reactive groups.

The calcium binding capacity which has an important meaning in the evaluation of the usability of the zeolite is reduced only insignificantly.

Likewise, the bulk density of the powdery zeolite is only reduced a trifling amount by the modification of the surface with the organosilanes.

Unless otherwise indicated, all parts and percentages are by weight.

The process can comprise, consist essentially of, or consist of the stated steps with the recited materials and the compositions can comprise, consist essentially of, or consist of the stated materials.

The following examples illustrate the invention.

DETAILED DESCRIPTION

As a measure of flowability or agglomeration behavior there is used the height of the alluvial cone.

The higher this value the lower is the flowability of the powder investigated.

In all cases there was used a zeolite of Type A (HAB A40) which was produced according to German OS No. 2651485 (and related Strack U.S. Pat. No. 4,303,629).

There were used the following 5 methods for applying the silane. The percent data mean weight % per 100 parts of mixture zeolite/silane.

Example 1

HAB A40 is present in an Erlenmeyer flask, treated with 0.5%, 0.1%, 0.05%, and 0.02% of propyl triethoxysilane and manually well mixed.

Example 2

The procedure was as in Example 1 but there was employed 5% of dimethyl diethoxysilane.

Example 3

HAB A40 was present in a Telschig free falling mixer and there was sprayed on it 1%, 0.5%, 0.1%, and 0.05% of propyl triethoxysilane.

Example 4

HAB A40 was treated with 1% of propyl triethoxysilane in 200 ml of an inert solvent (specifically ethanol) and boiled at reflux for 2 hours.

The samples were reacted for 4 hours at 150° C. and subsequently there was determined the calcium binding capacity as well as the height of the alluvial cone as a measure of the flow behavior (see the table).

Example 5

HAB A40 was present as a suspension in water in which there were then stirred in 2% and 0.05% of propyl triethoxysilane. Spray drying was then employed.

|  | Calcium Binding Capacity (mg CaO/g HAB) | Height of Alluvial Cone (cm) |
|---|---|---|
| Ex. 1 HAB A 40 untreated | 160 | 9.2 |
| HAB A 40 + 0.5% Silane I | 126.2 | 2.5 |
| HAB A 40 + 0.1% Silane I | 129.0 | 6.5 |
| HAB A 40 + 0.05% Silane I | 145.8 | 7.5 |
| HAB A 40 + 0.02% Silane I | 162.6 | 7.2 |
| Ex. 2 HAB A 40 + 5.0% Silane II | 137.9 | 7.7 |
| Ex. 3 HAB A 40 + 1% Silane I (Telschig-Mixer) | 126.2 | 4.6 |
| HAB A 40 + 0.5% Silane I (Telschig-Mixer) | 134.6 | 6.8 |
| HAB A 40 + 0.1% Silane I (Telschig-Mixer) | 140.2 | 9.2 |
| HAB A 40 + 0.05% Silane I (Telschig-Mixer) | 140.2 | 10.6 |
| Ex. 4 HAB A 40 + 1.0% Silane I (Inert solvent) | 134.6 | 6.5 |

Silane I = Propyltriethoxysilane
Silane II = Dimethyldiethoxysilane

Example 5.1

| Spray experiment 2% Silane Insertion | | 20 kg Insertion |
|---|---|---|
| 35.4 kg | 44% Batch | 0.4 kg Silane + 4 kg H$_2$O |
| Solids Content | | 39.2% |

-continued

| | |
|---|---|
| T° waste air | 120° C. |
| T° Burner | 490° C. |
| Pressure | 2 bar |
| Height of Alluvial Cone | 7.2 cm |
| Bulk density | 370 g/l |
| Bulk density HAB A 40 (untreated) | 380 g/l |
| Calcium binding capacity | 148.62 mg CaO |

Example 5.2

| | | |
|---|---|---|
| Spray experiment 0.5% Silane Insertion | | 20 kg Insertion |
| 45.5 kg | 44% Batch | 0.1 kg Silane |
| | | 4 kg H$_2$O |
| Solids Content | | 40.4% |
| T° waste air | | 116° C. |
| T° Burner | | 490° C. |
| Pressure | | 2 bar |
| Height of Alluvial Cone | | 7.1 cm |
| Bulk density | | 380 g/l |
| Calcium binding capacity | | 154.2 mg CaO |

Example 6 Washing powder

| | |
|---|---|
| 18% | STP = sodiumtripolyphosphate |
| 16% | HAB A 40 + 0,02% Silane I |
| 6% | LAS = linear Alkylbenzenesulphonate, sodium salt |
| 2% | tallow alcohol 5 E O |
| 2% | c 16-18 fatty alcohol 11 EO |
| 2% | Sodiumstearate |
| 25% | Sodiumperborate - tetrahydrate |
| 5% | Sodium silicate |
| 5% | Soda ash |
| 1 | Carboxymethylcellulose |
| 1,5 | Magnesiumsilicate |
| ad 100% | Sodiumsulphate, water, enzymes, purfumes, optical brightener |

The experiments have shown that an improvement of the flowability and the agglomeration behavior is attainable by addition of 2% and 0.5% silane according to these methods in the spray tower.

The entire disclosure of German priority application No. P 3208598.2 is hereby incorporated by reference.

What is claimed is:

1. A process for the production of a crystalline zeolite in the sodium form having the surface modified with an organosilane comprising reacting the zeolite with 0.02 to 5 weight % based on the amount of zeolite employed of an organosilane of the formula $$R_n{}^1SiR^2(OR)_{3-n}$$

where R and R$^1$ are C$_1$–C$_5$ alkyl, methoxy, ethoxy, phenyl, or C$_5$ to C$_8$ cycloalkyl and R$^2$ is a hydrocarbon group having 1 to 8 carbon atoms and free from ethylenic unsaturation and n is 0, 1, or 2.

2. A process according to claim 1 carried out in the absence of a solvent.

3. A process according to claim 1 carried out in the presence of an organic solvent for the organosilane.

4. A process according to claim 3 wherein the solvent is an inert apolar hydrocarbon solvent.

5. A process according to claim 1 comprising adding the organosilane to a suspension of the zeolite in water.

6. A process according to claim 1 wherein R$^2$ is alkyl of 3 to 8 carbon atoms, phenyl, or cycloalkyl of 5 to 8 carbon atoms.

7. A process according to claim 1 wherein R$^1$ is alkyl of 1 to 3 carbon atoms, methoxy or ethoxy, R$^2$ is alkyl of 1 to 3 carbon atoms, and R is methoxy, or ethoxy and n is 0 or 1.

8. A process according to claim 7 wherein the organosilane is n-propyltriethoxysilane or dimethyldiethoxysilane.

9. A process according to claim 1 wherein the zeolite is a zeolite of Type A.

10. A process according to claim 9 wherein R$^1$ is alkyl of 1 to 3 carbon atoms, methoxy or ethoxy, R$^2$ is alkyl of 1 to 3 carbon atoms, R is methoxy or ethoxy and n is 0 or 1.

11. A process according to claim 9 wherein the organosilane is n-propyltriethoxysilane or dimethyldiethoxysilane.

12. A process according to claim 5 wherein the solids content of the aqueous suspension is 20 to 60 weight % and the process includes the step of spray drying the suspension.

13. A process according to claim 11 wherein the organosilane is n-propyltriethoxysilane or dimethyldiethoxysilane.

14. The organosilane surface modified zeolite prepared by the process of claim 1.

15. The organosilane surface modified zeolite prepared by the process of claim 6.

16. The organosilane surface modified zeolite prepared by the process of claim 7.

17. The organosilane surface modified zeolite prepared by the process of claim 8.

18. The organosilane surface modified zeolite prepared by the process of claim 9.

19. The organosilane surface modified zeolite prepared by the process of claim 10.

20. The organosilane surface modified zeolite prepared by the process of claim 11.

21. A detergent or cleansing composition containing the organosilane surface modified zeolite of claim 13.

22. A surface modified zeolite according to claim 13 containing 0.02 to 2 weight % of organosilane.

* * * * *